(12) United States Patent
Kintzinger et al.

(10) Patent No.: US 7,591,975 B2
(45) Date of Patent: Sep. 22, 2009

(54) MOLDED ARTICLE PICKER

(75) Inventors: Rainer Kintzinger, Merzig (DE); Derek Robertson McCready, Mississauga (CA); Luc Rommes, Eischen (LU); Arnold Mai, Irrel (DE)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 11/846,711

(22) Filed: Aug. 29, 2007

(65) Prior Publication Data

US 2008/0166441 A1 Jul. 10, 2008

Related U.S. Application Data

(63) Continuation-in-part of application No. 11/621,639, filed on Jan. 10, 2007.

(51) Int. Cl.
*B66C 1/02* (2006.01)
(52) U.S. Cl. .................. 264/571; 264/538; 264/542; 425/445; 425/534; 425/556
(58) Field of Classification Search ............ 425/185, 425/437, 444, 445, 534, DIG. 60; 414/793, 414/797; 264/232, 335, 542, 538, 571
See application file for complete search history.

(56) References Cited

U.S. PATENT DOCUMENTS

| | | | | |
|---|---|---|---|---|
| 4,589,648 A | * | 5/1986 | Hancock | 271/106 |
| 4,625,953 A | * | 12/1986 | Hamatani | 271/1 |
| 4,640,503 A | * | 2/1987 | Naumann | 271/103 |
| 4,729,732 A | | 3/1988 | Schad et al. | |
| 4,763,778 A | * | 8/1988 | Feddersen et al. | 198/867.08 |
| 4,890,726 A | * | 1/1990 | Wissmann | 198/803.12 |
| 4,919,587 A | * | 4/1990 | Tashiro et al. | 414/795.8 |
| RE33,237 E | | 6/1990 | Delfer | |
| 5,447,426 A | | 9/1995 | Gessner et al. | |
| 5,688,008 A | * | 11/1997 | Hansch | 294/64.1 |
| 6,171,541 B1 | | 1/2001 | Neter et al. | |
| 6,247,891 B1 | * | 6/2001 | Lind | 414/811 |
| 6,769,895 B2 | * | 8/2004 | Derouault et al. | 425/145 |
| 6,886,827 B2 | * | 5/2005 | Dachtler | 271/106 |
| 6,951,452 B2 | * | 10/2005 | Unterlander et al. | 425/145 |
| 6,971,838 B2 | * | 12/2005 | Johnson et al. | 414/796.7 |
| 7,083,407 B2 | * | 8/2006 | Seki et al. | 425/534 |

(Continued)

FOREIGN PATENT DOCUMENTS

CA 2589424 A1 6/2006

(Continued)

*Primary Examiner*—Yogendra Gupta
*Assistant Examiner*—Emmanuel S Luk (57) ABSTRACT

Disclosed are a molded article picker for a post-mold device and a related method for the use of the molded article picker for handling a molded article. The molded article picker includes a floating element being configured to be movable between an extended position and a retracted position and biased in the extended position. Furthermore, the molded article picker comprises a pressure structure extending through the floating element. The floating element is cooperable with the molded article to define a substantially enclosed volume including the pressure structure. The pressure structure is configured such that by evacuating the substantially enclosed volume the molded article is sealed to the floating element and the floating element is drawn into the retracted position, thereby transferring the molded article to the molded article picker.

41 Claims, 10 Drawing Sheets

U.S. PATENT DOCUMENTS

| | | |
|---|---|---|
| 7,104,779 B2 * | 9/2006 | Howlett ..................... 425/534 |
| 7,104,780 B2 | 9/2006 | Domodossola et al. |
| 7,326,046 B2 * | 2/2008 | Neter et al. ................. 425/547 |
| 2002/0028265 A1 * | 3/2002 | Oueslati et al. ............. 425/547 |
| 2004/0121038 A1 * | 6/2004 | Seki et al. ................... 425/529 |
| 2004/0258791 A1 * | 12/2004 | Neter et al. ................. 425/546 |
| 2006/0204605 A1 * | 9/2006 | Neter et al. ................. 425/526 |
| 2007/0264385 A1 * | 11/2007 | McCready et al. .......... 425/547 |

FOREIGN PATENT DOCUMENTS

EP        1123189 B1       6/2003

* cited by examiner

MOLDED ARTICLE PICKER

CROSS-REFERENCE TO RELATED PATENT APPLICATION

This patent application is a Continuation-in-Part patent application of prior U.S. patent application Ser. No. 11/621,639, filed Jan. 10, 2007. This patent application also claims the benefit and priority date of prior U.S. patent application Ser. No. 11/621,639, filed Jan. 10, 2007.

TECHNICAL FIELD OF THE INVENTION

The present invention generally relates to molded article pickers, and more specifically the present invention relates to, but is not limited to, a post-mold device including such a molded article picker, a molding system including the post-mold device, and a related method for the use of the molded article picker for handling a molded article.

BACKGROUND OF THE INVENTION

A lot of injection molded articles, for example plastic preforms of the variety that are for blow molding into beverage bottles, require extended cooling periods to solidify into substantially defect-free molded articles. To the extent that the cooling of the molded article can be effected outside of the injection mold by one or more so-called post-mold devices, the productivity of the injection mold may be increased (i.e. by reducing the cycle time). A variety of such post-mold devices, and related methods, are known and have proven effective in optimizing, i.e. reducing, the injection molding machine cycle time.

In a typical injection molding system a just-molded, and hence only partially cooled, molded article is ejected from the injection mold and into a post-mold device, commonly known as a take-out device or end-of-arm-tool (EOAT), having a plurality of cooled carriers (otherwise known as a cooling tube, take-out tube, cooling sleeve, amongst others) for post-mold cooling of the molded article outside of the mold.

U.S. Pat. No. Re. 33,237 describes a post-mold device for removing partially cooled injection molded preforms from the core side of an injection mold. The preforms are ejected from the mold directly into cooled carriers (such as that described in commonly assigned U.S. Pat. No. 4,729,732), and transported by the post-mold device to an outboard position adjacent the mold. The post-mold device may include multiple sets of carriers to accommodate multiple sets of preforms (i.e. multiple shots or batches of preforms).

Commonly assigned U.S. Pat. No. 6,171,541 describes another post-mold device that includes a set of cooling pins for insertion into the interior of a partially cooled preform, the preform arranged in a cooled carrier of a first post-mold device, to discharge a cooling fluid therein. An example of the foregoing is sold under the trade name of COOLJET, a trademark of Husky Injection Molding Systems Limited.

Commonly assigned U.S. Pat. No. 7,104,780 describes a post-mold device similar to that of the '541 patent further including molded article pickers for removal of the preform from the cooled carrier of the first post-mold device. The molded article picker includes a pin operable to cooperate with a vacuum source to evacuate a volume defined within the preform to cause the preform to remain therewith as the molded article picker is moved away from the carrier. The second post-mold device, mounted to a frame, may be rotated by 90 degrees to a discharge position and the vacuum to the molded article pickers may be terminated to allow the preforms to fall off the pins.

An example of the foregoing post-mold device is sold under the trade name of COOLPIK, a trade-mark of Husky Injection Molding Systems Limited. The molded article picker of the second post-mold device further includes a sealing surface disposed on a front face of a tooling plate to sealingly cooperate with a front face of the preform in response to the evacuation of the volume. According to this solution the preform is transferred over a small gap between the front face of the preform, arranged in the carrier of the first post-mold device, and the sealing surface of the molded article picker.

Although the above solution already constitutes a substantial improvement with respect to the prior art it has been found that in practice the transfer of the molded article from a carrier to the molded article picker sometimes fails. It is believed that this improper transfer is caused by an insufficient vacuum applied and the air flow resulting therefrom to transfer the molded article across the gap between the front face of the molded article and the sealing surface of the molded article picker. This occurs especially with molded articles having a shallow draft on the outside thereof. Consequently, it can happen that molded articles are not transferred properly, i.e. are left in the carrier, and, thus, block this carrier for the introduction of a molded article of the next shot of molded articles, which for obvious reasons is highly undesirable.

There is, thus, a need for a molded article picker providing for an improved reliability of transfer of a molded article from a carrier on a first post-mold device to such a molded article picker on a second post-mold device.

SUMMARY OF THE INVENTION

According to a first aspect of the present invention, there is provided a molded article picker for a post-mold device for transferring a molded article. The molded article picker includes a floating element being configured to be movable between an extended position and a retracted position and a pressure structure. The floating element is cooperable with the molded article to define a substantially enclosed volume including the pressure structure. The pressure structure is configured such that by evacuating the substantially enclosed volume the molded article is sealed to the floating element and the floating element is drawn into the retracted position, thereby transferring the molded article to the molded article picker.

According to a second aspect of the present invention, there is provided a post-mold device including a tooling plate and a molded article picker as described in the previous section arranged on the tooling plate.

According to a third aspect of the present invention, there is provided a molding system comprising a post-mold device, having a tooling plate and a molded article picker as described above arranged on the tooling plate for transferring a molded article.

According to a fourth aspect of the present invention, there is provided a method for transferring a molded article, comprising the steps of bringing a floating element of a molded article picker in an extended position, at least in part, into abutment with a surface of the molded article and evacuating the enclosed volume defined by the molded article and the floating element such that the molded article is sealed to the floating element and the floating element is drawn into a retracted position, thereby transferring the molded article.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

DETAILED DESCRIPTION OF THE PREFERRED EMBODIMENTS

Figure 1:
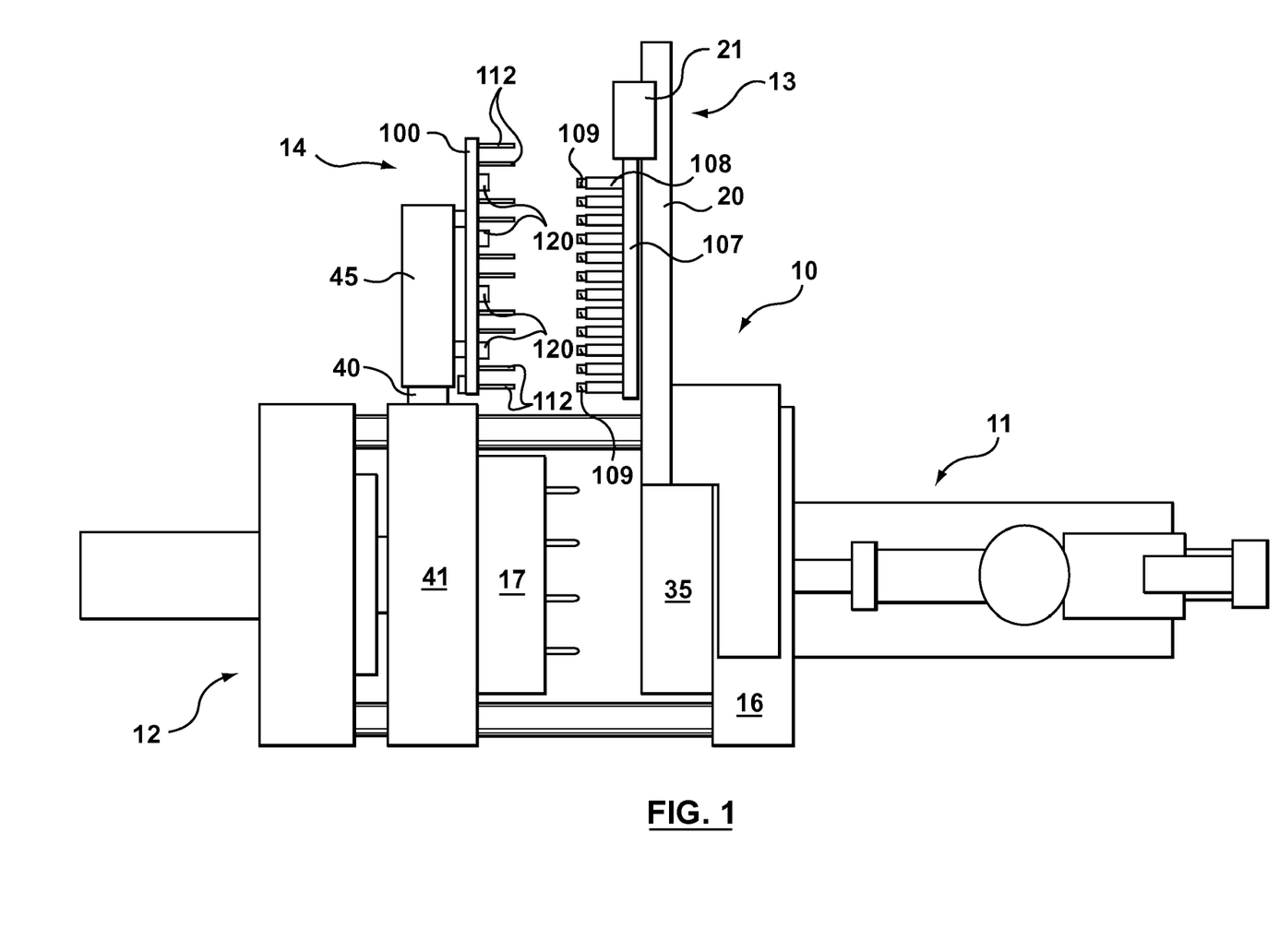
FIG. 1 is a plan view of an injection molding machine including a presently preferred embodiment of the molded article picker being arranged on a tooling plate of a post-mold device.

With reference to FIG. 1, a top plan view of an exemplary injection molding machine 10 is shown, comprising an injection unit 11, a clamp unit 12, a first post-mold device 13, and a second post-mold device 14. An injection mold comprising a cavity and core half 35, 17, is shown arranged between the stationary and moving platens 16, 41 of the clamp unit 12. The mold 35, 17 including molding inserts (not shown) of a stack assembly defining a molding cavity.

The first post-mold device 13 is mounted on the stationary platen 16 and includes a beam 20 that projects to one side of the machine (e.g. the non-operator side) and upon which rides a carriage 21, moved along the beam by (typically) a servo-electric driven belt drive (not shown). A tooling plate 107 is attached to the carriage 21. Multiple sets of carriers 108, e.g. three sets in the exemplary embodiment, are mounted on the tooling plate 107 and may be cooled for transporting multiple molded shots of molded articles 109 (the 'molded article' also will be henceforth referred to as a 'preform' in keeping with the context of the exemplary embodiment) ejected from the mold from an inboard (loading) position (not shown).

The second post-mold device 14 includes a tooling plate 100 upon which are mounted multiple sets of cooling pins 112, two sets in the exemplary embodiment, and a set of molded article pickers 120 in accordance with the preferred embodiment. In FIG. 1, the molded article pickers 120 are provided in every third row. In other words, for every molded article picker 120 there are two cooling pins 112 on the tooling plate 100. However, the person skilled in the art will appreciate that the number of sets of cooling pins 112 could be different, i.e. for every molded article picker 120 there could be only one cooling pin 112 or more than two cooling pins 112, or the cooling pins 112 may be omitted entirely.

A rotatable mount 40, 45 attaches the tooling plate 100 to moving platen 41 for rotation through an arc. The rotation of the tooling plate 100 can be effected, for example, by an electric drive (not shown) mounted to the rotatable mount 40, 45.

In operation, a shot or batch of molded articles or preforms 109 are transferred into a set of empty carriers 108 when the mold is open and the tooling plate 107 is positioned such that the empty carriers 108 are aligned with preforms 109 on the core half 17. The tooling plate 107 is then moved to its outboard position by the carriage 21, as shown in FIG. 1. The mold is then closed and clamped for the next molding cycle.

Figure 2:
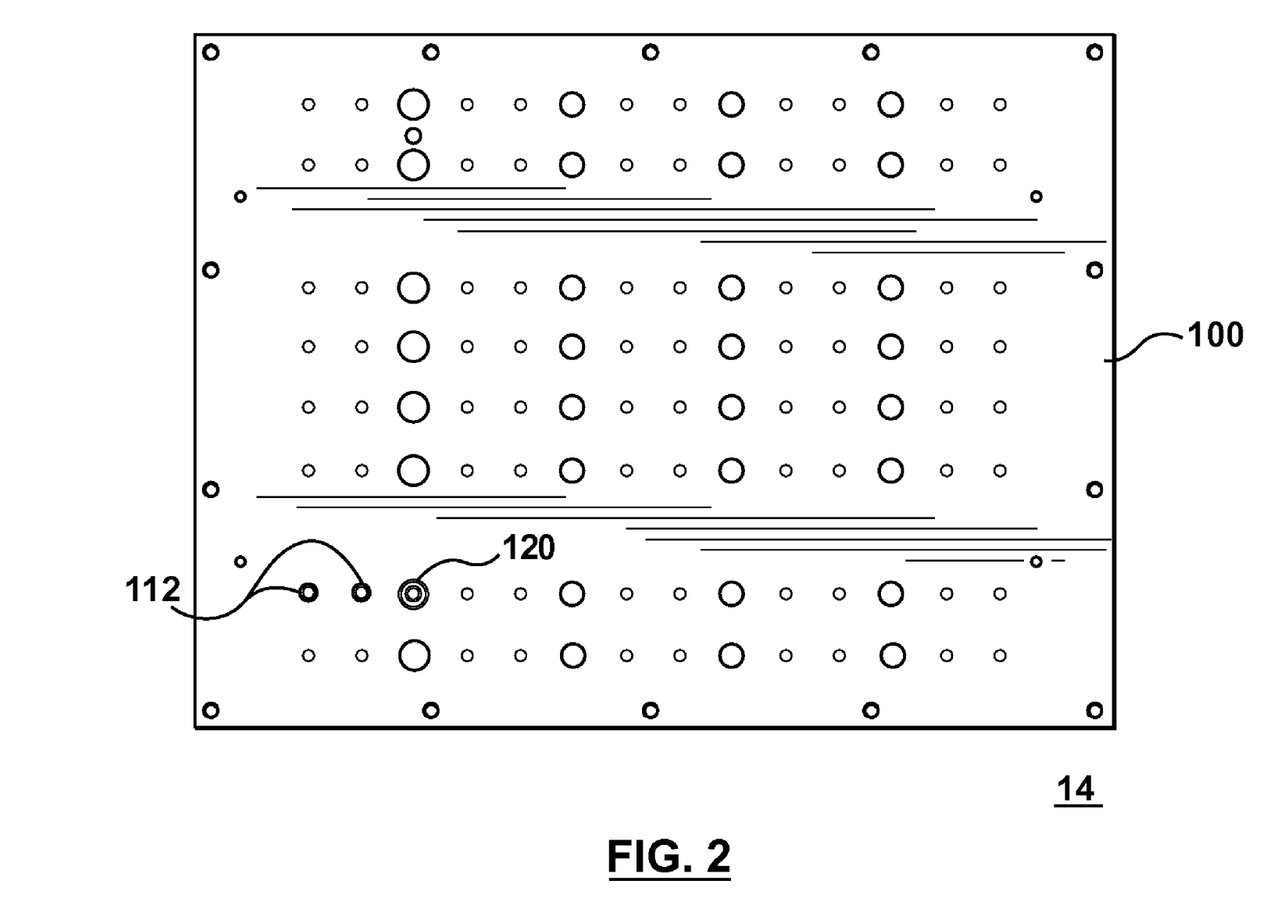
FIG. 2 is a plan view of a partially assembled tooling plate of a post-mold device that includes the presently preferred molded article picker.
Figure 3:
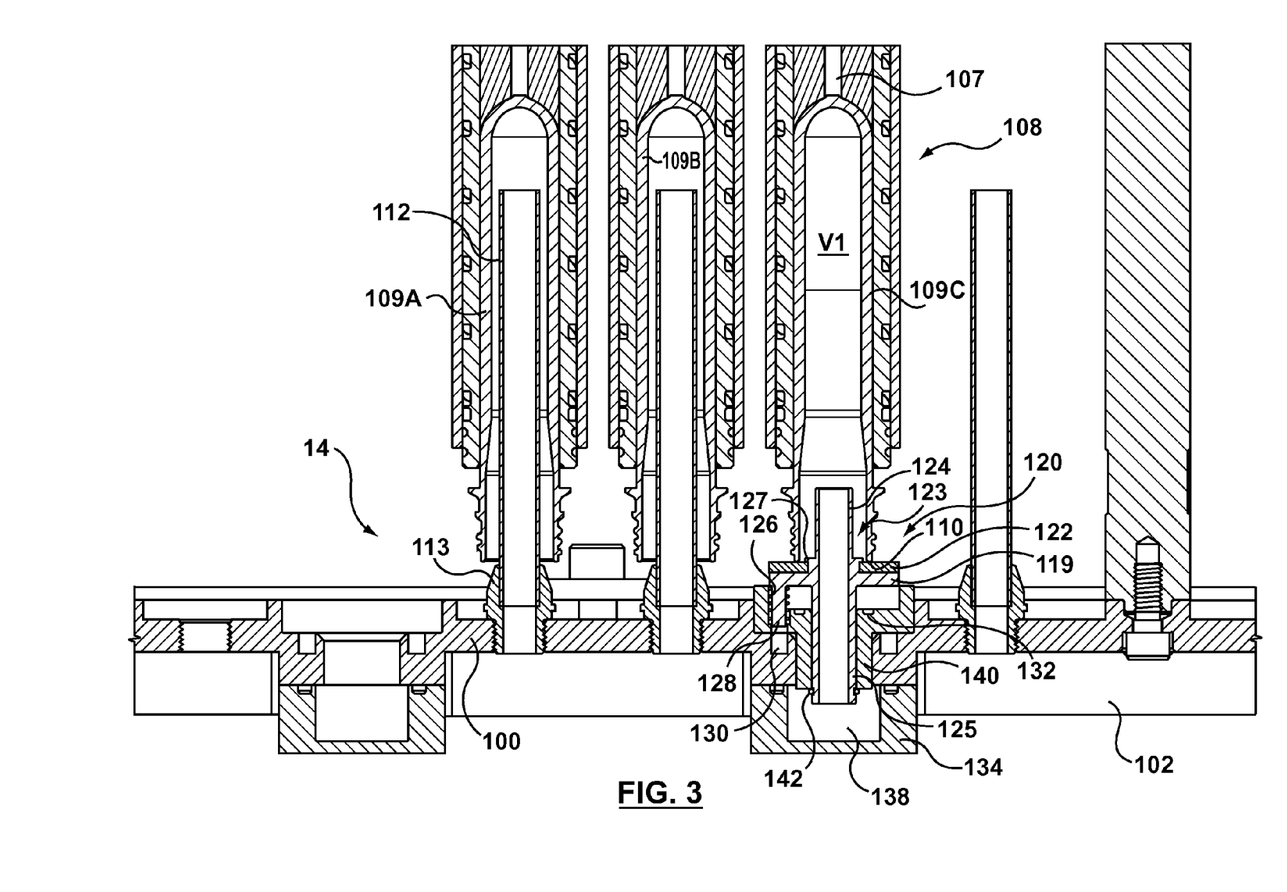
FIG. 3 is a sectional view of the molded article being transferred from a carrier to the presently preferred embodiment of the molded article picker with the floating element in the extended position.
Figure 4:
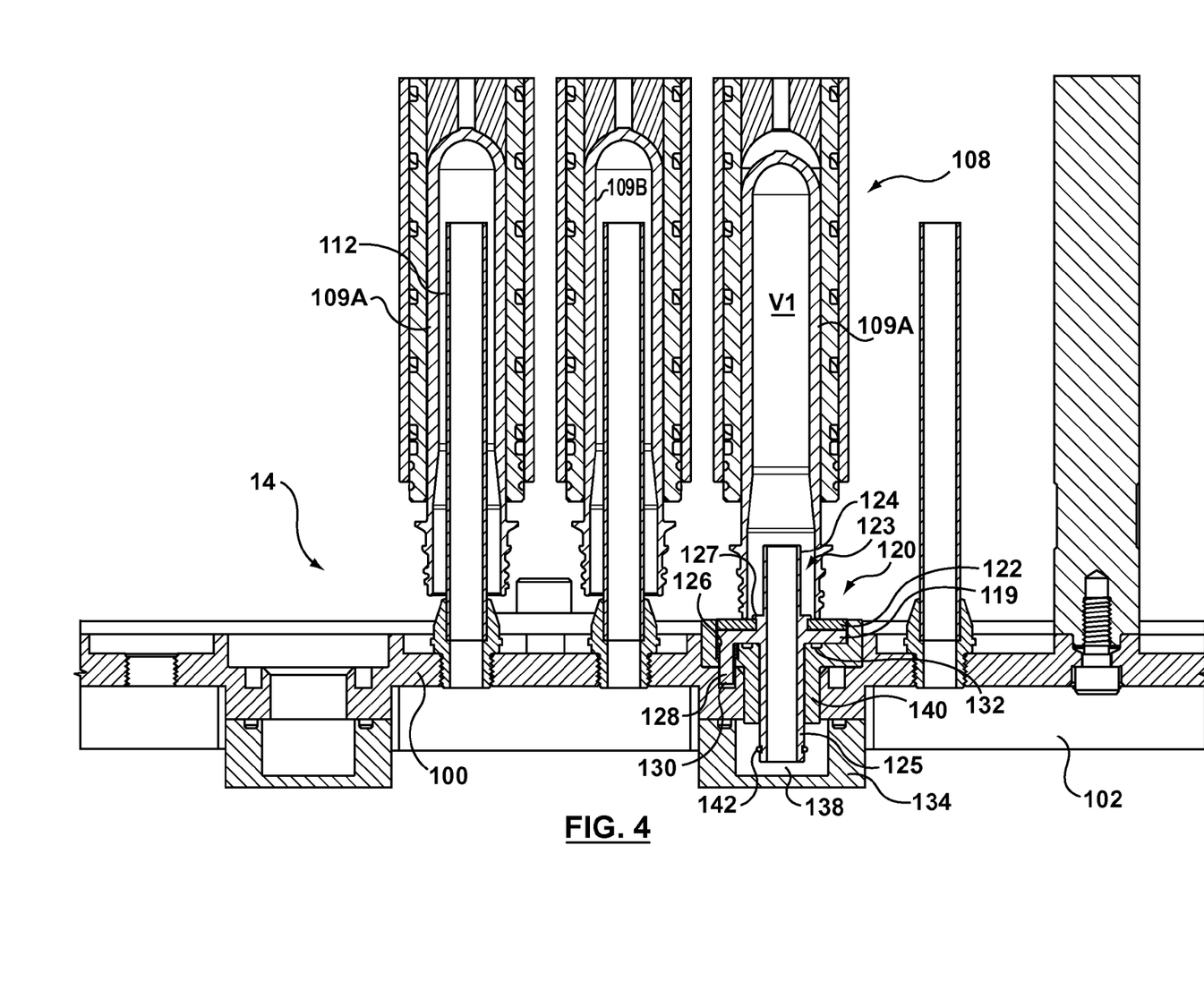
FIG. 4 is a sectional view of the molded article being transferred from the carrier to the presently preferred embodiment of the molded article picker with the floating element in the retracted position.

Meanwhile, as the mold closes, the tooling plate 100 of the second post-mold device 14 moves towards the molded article carriers 108, whereby the sets of cooling pins 112 are arranged within the interior of the corresponding preforms 109 that have been most recently molded, and the molded article pickers 120 are arranged to engage an end portion, and in particular the front face 110 (as shown in FIGS. 3 & 4), of the preforms 109 that have been in the carriers 108 the longest, as will be described in more detail further below. In the embodiment shown in FIGS. 1 & 2, a set of preforms 109 will have been held by the carriers 108 through three molding cycles before they are engaged by the molded article pickers 120 and withdrawn from the carriers 108. The tooling plate 100 is then rotated by 90 degrees and the molded articles 109 held by the molded article pickers 120 are dropped onto a conveyor (not shown) beneath the injection molding machine 10. The remaining molded articles 109 continue to be held in their carriers 108 by means of a vacuum.

As shown in FIG. 2, the tooling plate 100 includes apertures for accommodating a plurality of columns and rows of molded article cooling devices 112 (the cooling device may be, for example, a cooling pin in keeping with the context of the exemplary embodiment, and henceforth will be referred to as such), and molded article pickers 120 (a representative pair of cooling pins 112 and a molded article picker 120 are shown for the three sets of this exemplary embodiment). In particular, in this configuration the apertures of every third column are configured to accommodate a molded article picker 120 and the apertures of the remaining columns are configured to accommodate cooling pins 112.

A preferred embodiment of a molded article picker 120 according to the present invention is depicted in FIGS. 3 & 4. A sectional view of the tooling plate 100 of the second post-mold device 14 is shown including two cooling pins 112 and a molded article picker 120 according to the preferred embodiment of the present invention, respectively cooperating with three preforms 109A, 109B and 109C being held within three carriers 108 of the first post mold device 13.

The molded article picker 120 according to the preferred embodiment of the present invention comprises a floating element 123 that is movably connected to and guided by a base element 140 which, in turn, is mounted to the tooling plate 100. The person skilled in the art, however, will appreciate that, alternatively, the base element 140 also could be an integral part of the tooling plate 100. As will be described in more detail further below the floating element 123 can be moved between an extended or forward position (shown in FIG. 3) and a retracted or rear position (shown in FIG. 4).

The floating element 123 of the molded article picker 120 according to the preferred embodiment of the present invention is spring-biased in the extended position for receiving preform 109 by means of at least one biasing and guiding assembly. Each biasing and guiding assembly comprises a compressible spring 126 that is coiled about a respective cylindrical guiding pin 128 depending from a radial flange 119 of the floating element 123. The cylindrical guiding pin 128 is slidably arranged and guided within a cylindrical guiding recess 130 formed in the base element 140 and the tooling plate 100. The preferred embodiment of the molded article picker 120 shown in FIGS. 3 & 4 comprises three such biasing and guiding assemblies consisting respectively of a compressible spring 126, a cylindrical guiding pin 128 and a corresponding cylindrical guiding recess 130. The three biasing and guiding assemblies of the preferred embodiment of the present invention are positioned with an angle of 120 degrees between each other relative to the central symmetry axis of the molded article picker 120 and radially spaced therefrom close to the outer edge of the radial flange 119. Such a configuration is preferable in order to avoid any misalignment between the molded article picker 120 and a preform 109 to be transferred. The person skilled in the art, however, will appreciate that a molded article picker 120 according to the preferred embodiment of the invention likewise could comprise less or more than three biasing and guiding assemblies.

In addition to the above described biasing and guiding assemblies the motion of the floating element 123 of the molded article picker 120 according to the preferred embodiment between the extended or forward and the retracted or rear position is furthermore guided by a cylindrical lower guide portion 125 of a pressure structure, preferably a vacuum pin 124, which is arranged within a cylindrical bore through the base element 140. The arrangement of the vacuum pin 124 within the cylindrical bore through the base element 140 should allow for a guided gliding movement of the vacuum pin 124 within the cylindrical bore and at the same time substantially prohibit the flow of fluid between the inner face of the cylindrical bore and the outer face of the guide portion 125 of the vacuum pin 124, as will be outlined in more detail below.

When no external forces are applied to the floating element 123 of the molded article picker 120 according to the preferred embodiment, due to the tendency of the at least one compressible spring 126 to relax itself from being compressed the floating element 123 will be spring-biased in the extended or forward position, as shown in FIG. 3. In order to avoid a detachment of the floating element 123 from the base element 140 and, thus, the tooling plate 100 due to the force exerted by the at least one spring 126, the floating element 123 comprises a retainer 142 at the lower end of the guide portion 125 of the vacuum pin 124. Any further motion of the floating element 123 and, thus, the vacuum pin 124 beyond the extended position or forward position thereof is impeded due to the abutment of the retainer 142 and the bottom face of the base element 140.

The molded article picker 120 comprises furthermore a compliable sealing element 122 disposed on the upper face of the radial flange 119 of the floating element 123. Preferably, the sealing element 122 is made from a silicone rubber and is bonded to the radial flange 119 and adjacent portions of the floating element 123 in proximity thereto, as shown in FIGS. 3 & 4, by means of a suitable adhesive material. In addition, a further retainer 127 can be provided in order assist in retaining the compliable sealing element 122 on the upper face of the radial flange 119 of the floating element 123.

In operation, when the tooling plate 100 of the second post-mold device 14 approaches the tooling plate 107 of the first post-mold device 13, during mold closing, the molded article picker 120 engages the preform 109 by bringing the front face 110 of the preform 109 in close contact and preferably into abutment with the upper face of the sealing element 122 on the upper face of the radial flange of the floating element 123. As it is made of a compliant material, preferably silicone rubber, upon contact with the front face 110 of the preform 109 the sealing element 122 will be deformed and compressed. However, due to the force exerted upon the radial flange 119 of the floating element 123 by the at least one compressed spring 126 as well as the tendency of the deformed sealing element 122 to restore its original shape, a fluid-tight seal will be formed between the front face 110 of the preform 109 and the sealing element 122 disposed on upper face of the radial flange 119 of the floating element 123 of the molded article picker 120 according to the preferred embodiment of the present invention. Thereafter, a pressure channel 138 formed between the lower face of the tooling plate 100 and a backing plate 134 affixed thereto and in fluid communication with the interior of the vacuum pin 124 is connected via a manifold (not shown) to a pressure source and the enclosed volume V1 defined by the interior of the preform 109 and the interior of the vacuum pin 124 is evacuated via the pressure channel 138. As the enclosed volume V1 defined by the interior of the preform 109 and the interior of the vacuum pin 124 is essentially sealed from the environment, the floating element 123 is withdrawn by the vacuum force into the retracted or rear position shown in FIG. 4. Consequently, the preform 109 being sealed to the floating element 123 (or more specifically to the sealing element 122 disposed on the upper face of the radial flange 119 thereof) is removed from the molded article carrier 108 and transferred to the molded article picker 120. Thereafter the second post mold device 14 may be retracted and the first post mold device 13 is then free to retrieve the next shot of preforms 109 from the molding structure 17, 35.

For preform 109 shown in the exemplary embodiment the floating element 123 is displaced by a distance of about 7 mm from its retracted or rear position to its extended or forward position, e.g. after the vacuum has been turned off and the preforms 109 have been dropped onto a conveyor. Preferably, the equilibration between the abutment of the front face 110 of a preform 109 of a subsequent batch and the sealing element 122 and the force exerted by the at least one spring 126 causes the floating element 123 to be displaced by about 2 mm in the direction of the retracted or rear position. Out of this position the floating element 123 and the preform 109 sealed thereto are moved into the retracted or rear position over a distance of about 5 mm by applying a vacuum to the enclosed volume V1 defined by the interior of the preform 109 and the vacuum pin 124 via the pressure channel 138.

As can be taken from FIG. 4, in the retracted or rear position of the floating element 123 the radial flange 119 thereof is seated in a cup-shaped recess defined by the top face and the side face of the base element 140, such that the upper end of the sealing element 122 is substantially flush with the upper face of the tooling plate 100. In this position, the cylindrical 128 essentially fill the whole space provided by the guiding recesses 130, thereby compressing the springs 126. Optionally, a cylindrical sealing ring or gasket 132 could be provided in the top face of the base element 140 to provide for a fluid-tight engagement between the sealing ring 132 and the bottom face of the radial flange 119 in the retracted or rear position of the floating element 123. Sealing rings could also be provided along the interfaces between the base element 140 and the tooling plate 100 and/or the tooling plate 100 and the backing plate 134.

Figure 5:
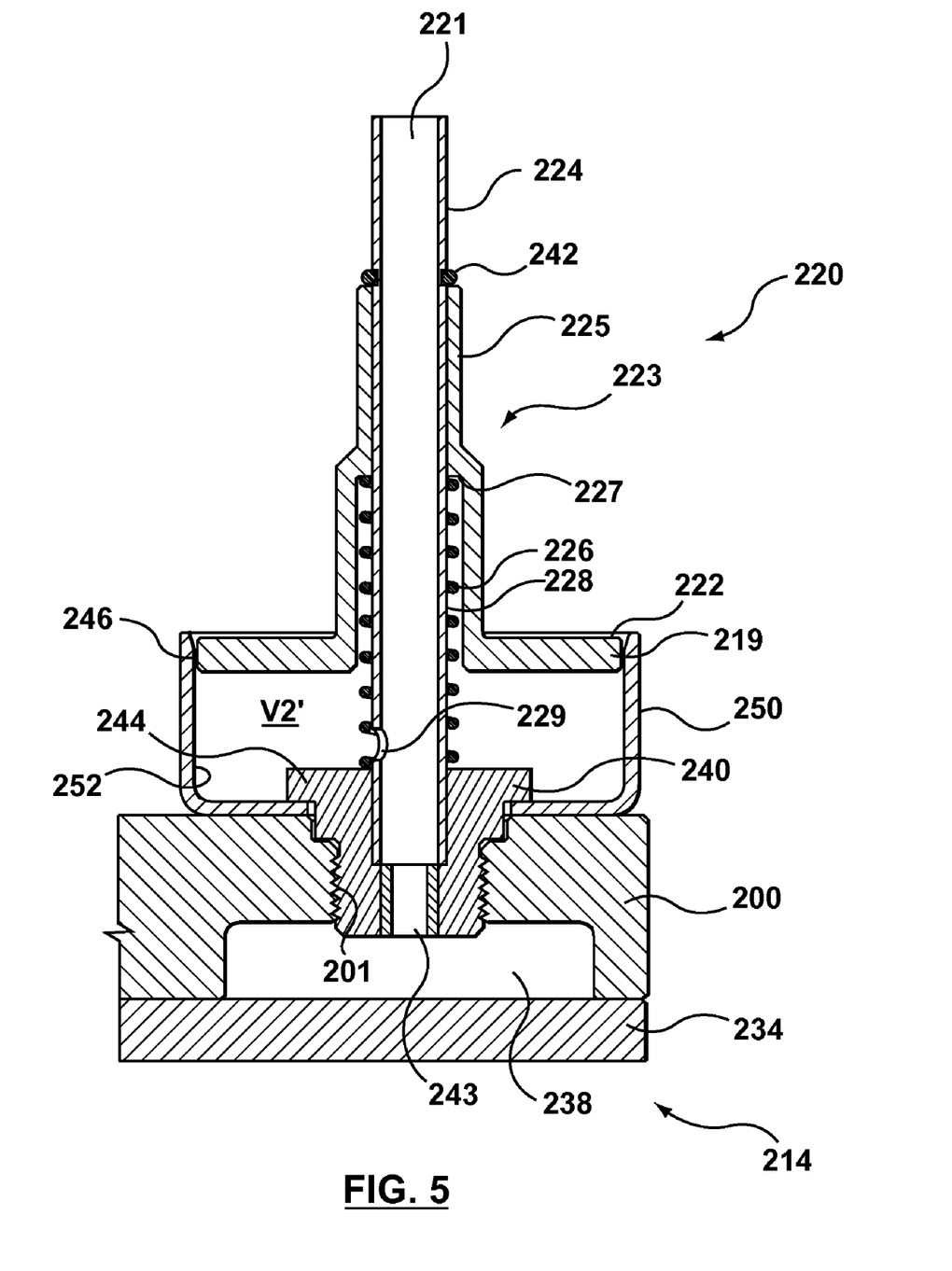
FIG. 5 is a sectional view of an alternative embodiment of the molded article picker with the floating element in the extended position.
Figure 6:
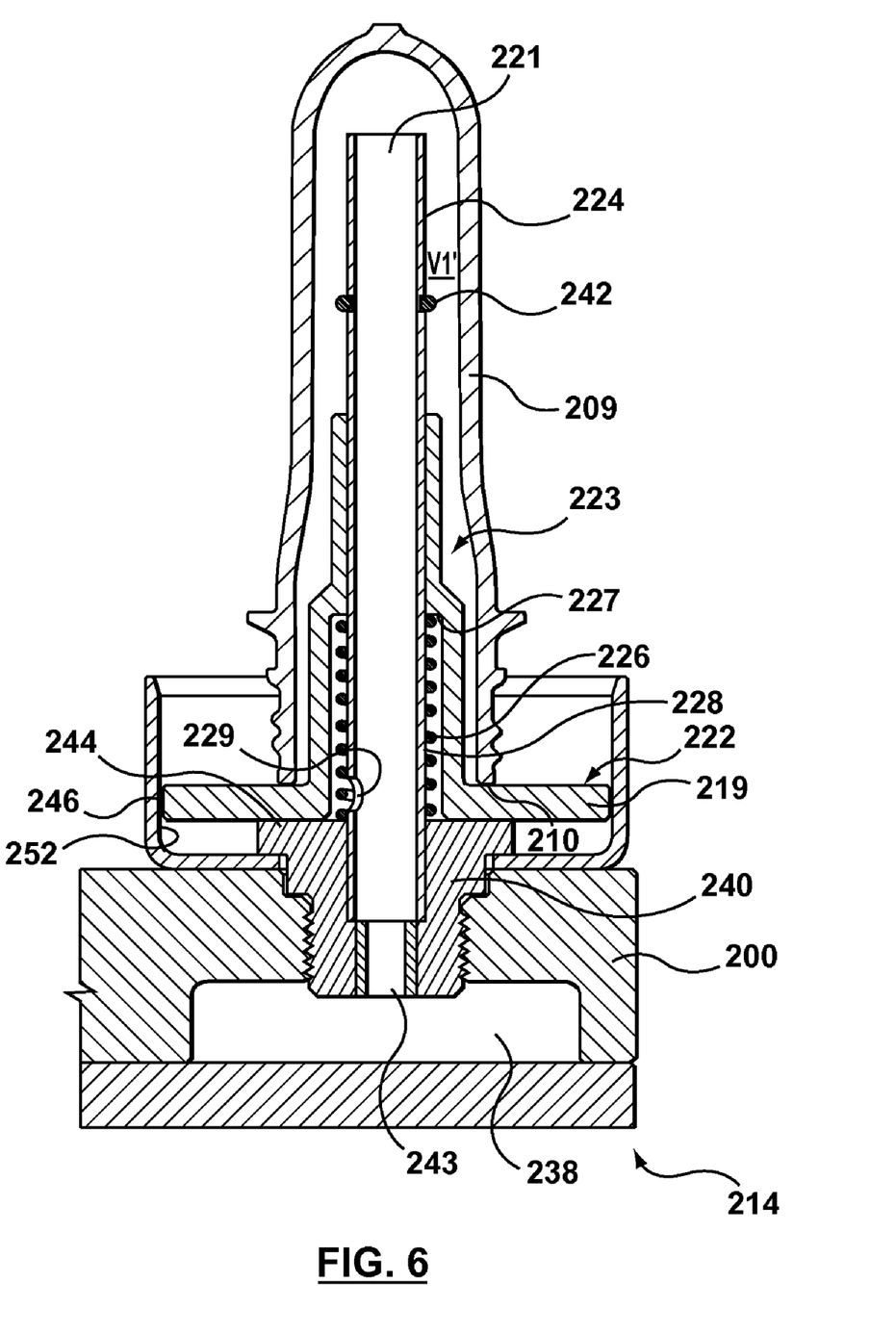
FIG. 6 is a sectional view of the alternative embodiment of the molded article picker of FIG. 5 with the floating element in the retracted position.

With reference to FIGS. 5 & 6 another exemplary embodiment of a molded article picker 220 is depicted mounted to a second post mold device 214. FIG. 5 depicts the molded article picker 220 in a configuration just prior to receiving a molded article 209, i.e. in the extended or forward position, whereas FIG. 6 depicts the molded article picker 220 in a configuration after having received and withdrawn a molded article 209 from a carrier (not shown) of the first post-mold device (not shown), i.e. in the retracted or rear position.

The molded article picker 220 includes a floating element 223 that is biased by a spring 226 to the extended or forward position, as shown in FIG. 5, for receiving the molded article 209. The floating element 223 retracts under a vacuum force, compressing the spring 226, to the retracted or rear position as shown in FIG. 6. The molded article picker 220 also includes a pressure structure comprising a vacuum pin 224 that is mounted to a tooling plate 200 via a base element 240 and a cup-shaped cylinder element 250 that is retained on the tooling plate 200 by a flange portion 244 of the base element 240. Preferably, the cylinder element 250 is retained on a front face of the tooling plate 200 by the base element 240 such that the cylinder element 250 has a limited degree of radial freedom such that it may align with a radial piston-like flange 219 of the floating element 223. The floating element 223 includes a guide portion 225 having an inner surface that cooperates with an outer surface of the vacuum pin 224 such that the floating element 223 is kept in longitudinal axial alignment with the vacuum pin 224 as the floating element 223 is moved between its extended or forward position and its retracted or rear position. The floating element 223 also includes a spring seat 227 that receives a forward portion of the spring 226. A rear portion of the spring 226 cooperates with a front face of the base element 240. The spring 226 is kept in longitudinal alignment with the vacuum pin 224 and with the floating element 223 by close cooperation of the spring 226 around a spring guide portion 228 defined on the outer surface of the vacuum pin 224. The vacuum pin 224 also includes a retainer 242, preferably a spring clip, arranged in a groove defined around the vacuum pin 224. The retainer 242 cooperates with a front face of the guide portion 225 of the floating element 223 to define a forward limit (FIG. 5) of travel of the floating element 223. The rear travel limit (FIG. 6) of the floating element 223 is defined by close cooperation of a rear face of the radial piston-like flange 219 and a front face of the base element 240. In this embodiment the floating element 223 may be fabricated, for example, from an ultrahigh molecular weight polyethylene (UHMWPE) such that a front face of the radial piston-like flange 219 is compliant to an extent that is provides a sealing face 222 that may readily form a seal with the front face 210 of the molded article 209.

As can be taken from FIGS. 5 & 6, a pressure channel 238 is defined between a pocket formed in the tooling plate 200 and a backing plate 234 arranged behind the tooling plate 200. In operation, the pressure channel 238 is to be connected to a pressure source, positive or negative, such as may be provided, for example, by a compressor or a vacuum pump, respectively. Furthermore a pressure channel 243 is formed in the base element 240 for connecting the pressure channel 238 of the tooling plate 200 with a pressure channel 221 that extends through the vacuum pin 224. In addition, an actuator pressure channel 229 is defined through a sidewall of the vacuum pin 224. The actuator pressure channel 229 is preferably arranged on the vacuum pin 224 in a location adjacent the base element 240. Lastly a close-fit, preferably fluid-tight, cooperation between an outer circumferential surface 246 of the radial piston-like flange 219 and an inner surface 252 is defined along the cylinder element 250 and may, optionally, include a piston seal disposed there between.

In operation, the second post mold device 14 is translated to cause the molded article picker 220 to engage the molded article 209, as explained previously with respect to the first exemplary embodiment, such that the front face 210 of the molded article 209 is arranged in close proximity, preferably in abutment, with the sealing face 222 of the floating element 223. Thereafter, the pressure channel 238 is connected to a pressure source and an enclosed volume V1' (FIG. 6) defined between the interior of the molded article 209 and the exterior of the molded article picker 220 is evacuated through the combination of the pressure channels 221, 243, and 238. Also, the enclosed volume V2' (FIG. 5) defined between the cup-shaped cylinder element 250 and the radial piston-like flange 219 of the molded article picker 220 and the outer surface of the vacuum pin 224 is evacuated through the combination of pressure channels including pressure channels 229, 221 (partly), 243, and 238, whereby the floating element 223 is retracted by a vacuum force to the retracted or rear position, as shown with reference to FIG. 6, and, consequently, the molded article 209 being sealed to the sealing face 222 of the floating element 223 is removed from the molded article carrier (not shown). Thereafter, the second post mold device 14 may be retracted and the first post mold device 13 is then free to retrieve the next shot of preforms 109 209 from the molding structure 17, 35.

With reference to FIGS. 7, 8A, 8B, 8C & 8D another non-limiting embodiment of a molded article picker 320 is depicted for use with the tooling plate 200 of the second post mold device 214 (FIGS. 5 & 6) in place of the molded article picker 220. The molded article picker 320 is similar in construction to the molded article picker 220 of FIGS. 5 and 6 as described previously. There are, however, several differences in construction between the molded article picker 220 and the molded article picker 320. A first difference is that the cup-shaped cylinder element 250 of the molded article picker 220 is not required with the molded article picker 320. A second difference is the provision of a cap 360 blocking an end of the vacuum pin 324. A third difference is the location of an actuator pressure channel 329 defined in a sidewall of a vacuum pin 324 that has been moved from the location adjacent the base element 240 in the molded article picker 220 to a location adjacent a guide portion 325 of a floating element 323 of the molded article picker 320 (in an extended position). The molded article picker 320 therefore includes the floating element 323, the vacuum pin 324, a spring 326, a retainer 342, the base element 340, and the cap 360.

Figure 7:
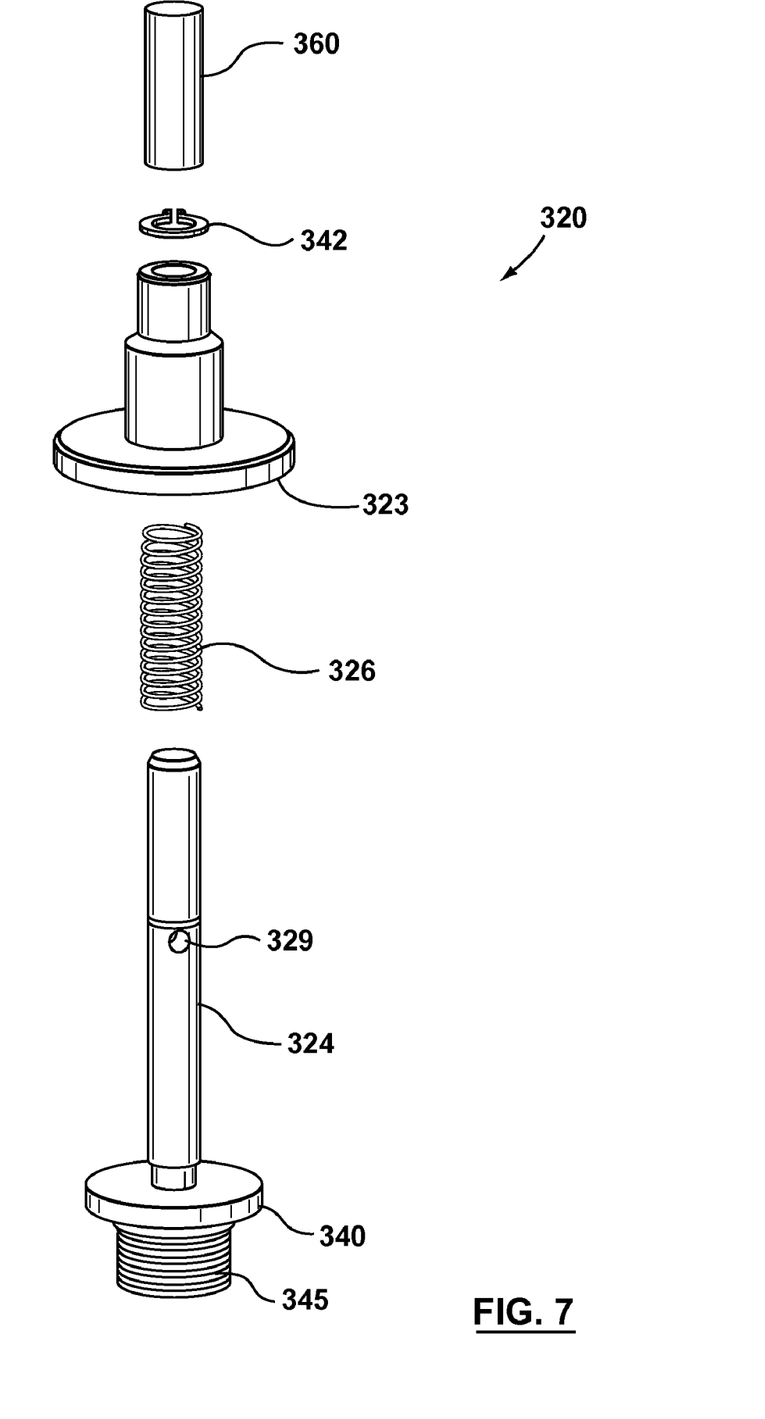
FIG. 7 is an exploded view of another non-limiting embodiment of the molded article picker.

The floating element 323 has a generally tubular body that surrounds, in use, the vacuum pin 324 (i.e. pressure structure) with the vacuum pin 324 extending through the floating element 323. The floating element 323 includes the guide portion 325, a spring seat 327, and a radial flange 319. The guide portion 325 is provided along an upper portion of the tubular body along an inner surface that is closely fitted with, but slightly larger than, an outer surface of the vacuum pin 324 such that the floating element 323 is kept in longitudinal axial alignment with the vacuum pin 324 as the floating element 323 is moved between its extended (or forward) position and its retracted (or rear) positions. The spring seat 327 is a portion of the tubular body having an inner surface that is configured to receive, in use, a forward portion of the spring 326. The radial flange 319 is a radial piston-like member that projects from a lower portion of the tubular body. In the non-limiting embodiment the floating element 323 may be fabricated, for example, from an ultrahigh molecular weight polyethylene (UHMWPE) such that a front face of the radial flange 319 is compliant to an extent that is provides a sealing face 322 that may readily form a seal with the front face 110 of the preform 109. Those skilled in the art would appreciate that there are other suitable materials, and combinations of materials from which to fabricate the floating element 323.

The base element 340 couples, in use, the vacuum pin 324, and with it the floating element 323, to the tooling plate 200 (FIGS. 5 and 6). The base element 340 has a generally tubular body that defines a vacuum pin coupling interface 346, a radial flange 344, a tooling plate coupling interface 345, a pressure channel 343, and a tool interface 347. The vacuum pin coupling interface 346 is a portion of the tubular body having an inner surface that is configured to couple, in use, with a base element coupling interface 348 of the vacuum pin 324. The radial flange 344 is a radial piston-like member that projects from the tubular body. The tooling plate coupling interface 345 is a portion of the tubular body having an outer surface that is configured to couple, in use, with a base element coupling interface 201 (FIG. 5) provided on an inner surface of the apertures formed in the tooling plate 200. The pressure channel 343 extends through the tubular body between the vacuum pin seat 346 and a bottom face of the tubular body for connecting, in use, a pressure channel 321 of the vacuum pin 324 with the pressure channel 238 (FIG. 5) defined between the pocket formed in the tooling plate 200 and the backing plate 234 arranged behind the tooling plate 200. The tool interface 347 is defined by inner surfaces of the tubular body in the pressure channel 338 that are configured to cooperate with a tool (not shown), such a hex-shaped key, to engage or disengage the tooling plate coupling interface 345 with the base element coupling interface 201.

The vacuum pin 324 is a generally tubular body that defines the pressure channel 321, base element coupling interface 348, a cap coupling interface 349, the actuator pressure channel 329, and a retainer groove 363. The pressure channel 321 is defined along an inner surface of the tubular body. The pressure channel 321 connects, in use, the actuator pressure channel 329 to the pressure channel 343 of the base element 340. The base element coupling interface 348 is a portion of the tubular body having an outer surface that is configured to couple, in use, with the vacuum pin coupling interface 346 of the base element 340. The cap coupling interface 349 is a portion of the tubular body having an outer surface that is configured to couple, in use, with a vacuum pin coupling interface 361 of the cap 360. The actuator pressure channel 329 is defined through the sidewall of a vacuum pin 324 in a location along the vacuum pin 324 that is selected such that two constraints are satisfied. The first of the two constraints is that the actuator pressure channel 329 be substantially covered, and therefore obstructed by, the guide portion 325 of the floating element 323 when the floating element 323 is positioned in the extended position. The second of the two constraints is that the actuator pressure channel 329 be substantially revealed from beneath the guide portion 325, and therefore unobstructed by, the guide portion 325 of the floating element 323 when the floating element 323 is positioned in a partially retracted position, as shown with reference to FIG. 8B, and in the retracted position, as shown with reference to FIG. 8C. The retainer groove 363 is a portion of the tubular body having an outer surface that is configured to couple, in use, with the retainer 342.

The cap 360 substantially obstructs, in use, the pressure channel 321 at a distal end the vacuum pin 324. The cap 360 is a generally tubular body having a closed end. The vacuum pin coupling interface 361 is a portion of the tubular body having an inner surface that is configured to couple, in use, with the cap coupling interface 361 of the vacuum pin 324.

The spring 326 biases, in use, the floating element 323 into the extended position. A rear portion of the spring 326 cooperates with a front face of the base element 340. The spring 326 is kept in longitudinal alignment with the vacuum pin 324 and with the floating element 323 by close cooperation of the spring 326 around a spring guide portion 328 defined on the outer surface of the vacuum pin 324.

Figure 8A:
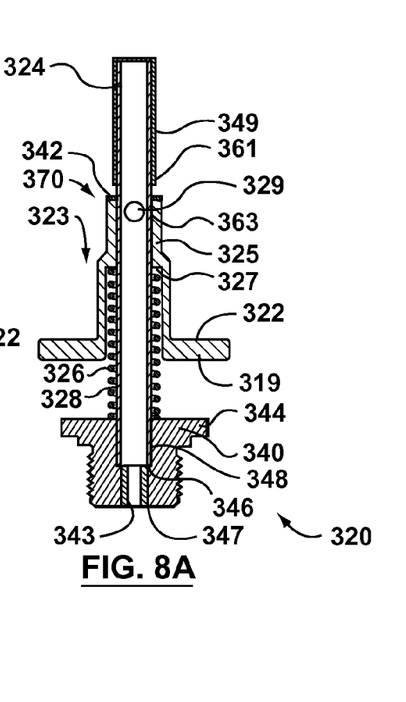
FIGS. 8A, 8B, 8C, and 8D depict a sectional view of the molded article picker of FIG. 7 through a sequence of stages of operation.
Figure 8B:
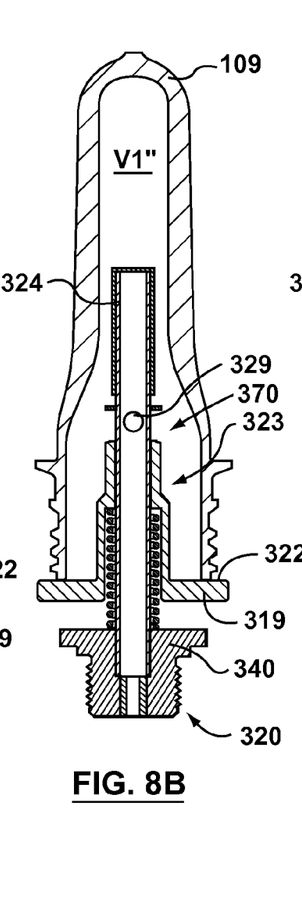
Figure 8C:
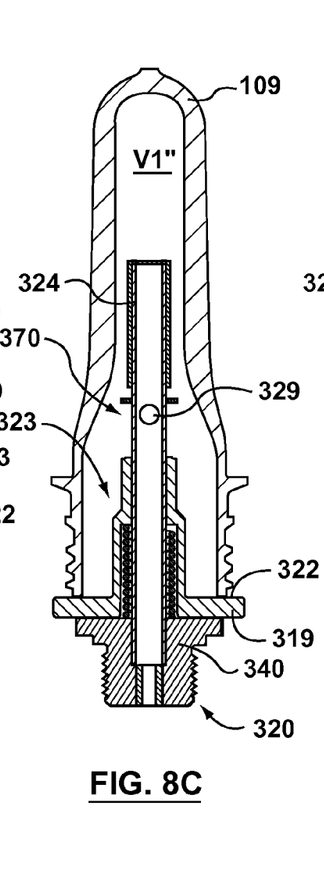
Figure 8D:
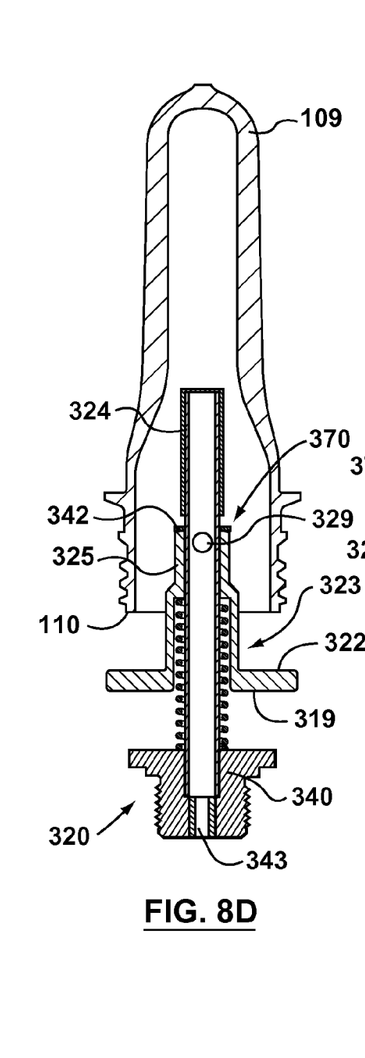

The FIGS. 8A, 8B, 8C, and 8D depict the molded article picker 320 of FIG. 7 through a sequence of stages of operation. FIG. 8A depicts the molded article picker 320 in an initial state before receiving the preform 109 with the floating element 323 biased into the extended position and the actuator pressure channel 329 covered by the guiding proton 325 of the floating element 323. FIG. 8B depicts the floating element 323 in the partially retracted position with the front face 110 of the preform 109 in contact with the sealing face 322 of the floating element 323 and the actuator pressure channel 329 revealed from beneath the guide portion 325 of the floating element 323. FIG. 8C depicts the floating element 323 in the retracted position with the front face 110 of the preform 109 remaining in contact with the sealing face 322 of the floating element 323 and the actuator pressure channel 329 revealed from beneath the guide portion 325 of the floating element 323. FIG. 8D depicts the floating element 323 once again in the extended position after having just ejected the preform 109 and the actuator pressure channel 329 once again covered by the guiding proton 325 of the floating element 323.

As shown with reference to FIG. 8A, the retainer 342 cooperates, in use, with a front face of the guide portion 325 of the floating element 323 to define the extended position, or forward limit of travel, of the floating element 323.

As shown with reference to FIG. 8C the retracted position, or rear travel limit, of the floating element 323 is defined by contact between a rear face of the radial piston-like flange 319 and a front face of the base element 340.

The partially retracted position of the floating element 323, as shown in FIG. 8B, is defined by a pre-determined separation (or distance) between the first post mold devices 13 and the second post mold device 14 (FIG. 1) when the injection mold is closed.

In operation, the second post mold device 214 with an arrangement of the molded article pickers 320, is translated to cause the sealing face 322 of the floating element 323 to engage the front face 110 of the preform 109 in the carrier 108 and thereby move the floating element to the partially retracted position (FIG. 8B) and in so doing reveal, at least partially, the actuator pressure channel 329. Thereafter, the pressure channel 338 is connected to a pressure source and an enclosed volume V1" (FIGS. 8B and 8C) defined between the interior of the preform 109 and the exterior of the molded article picker 320 is evacuated through the actuator pressure channel 329. In evacuating the enclosed volume V1" the floating element 323 is moved a remaining distance from the partially retracted position to the retracted position and in so doing retract the preform 109 further from the carrier 108 (FIG. 1) of the first post mold device 13 (FIG. 1). Thereafter, with the opening of the injection mold the second post mold device 214 is withdrawn from the first post mold device 13 and with it the preforms 109 on the molded article pickers 320. While the first post mold device 13 retrieves the next shot of preforms 109 from the open injection mold, the second post mold device 214 is re-positioned for ejection of the previously captured preforms. The ejection of the preforms 109 from the molded article pickers 320 is performed by controlling the pressure source to increase the air pressure in the pressure channel 238 to an ambient level or higher.

Generally, the guide portion 325 of the floating element 323, the spring 326, and the actuator pressure channel 329 of the vacuum pin 324 cooperate, in use, to provide a normally-closed valve 370 for controlling a pneumatic connection between the pressure channel 321 of the vacuum pin 324 and the enclosed volume V1", wherein normally-closed valve 370 is opened responsive to a pressure applied to the floating element 323 by the preform 109.

Figure 9:
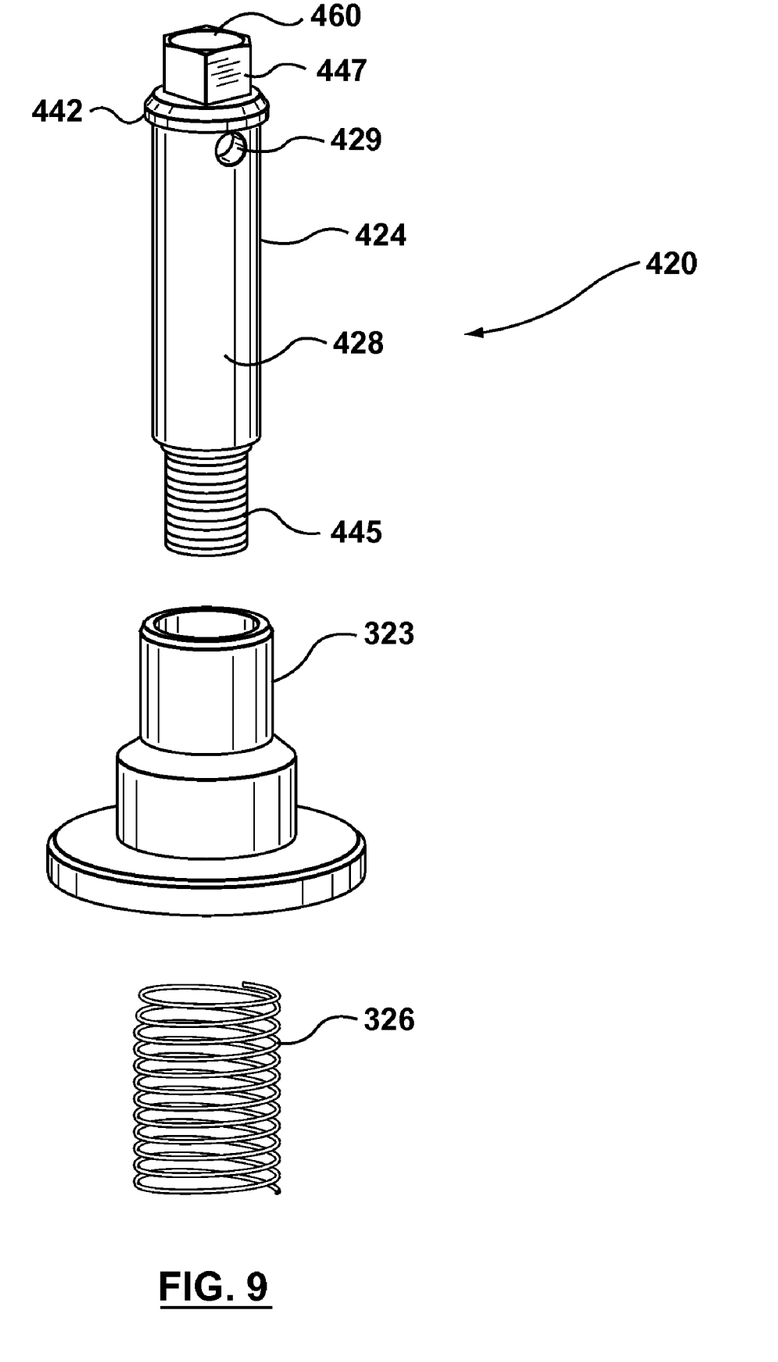
FIG. 9 is an exploded view of another non-limiting embodiment of the molded article picker.

With reference to FIG. 9 another non-limiting embodiment of a molded article picker 420 is depicted for use with the tooling plate 200 of the second post mold device 214 (FIGS. 5 & 6) in place of the molded article picker 220. The molded article picker 420 is similar in construction to the molded article picker 320 of FIG. 8 as described previously. The difference in construction is limited to the construction of the vacuum pin 424.

The vacuum pin 424 is a generally tubular body that defines the pressure channel 421 (FIG. 10), tooling plate coupling interface 445, a cap 460, the actuator pressure channel 429, a retainer 442, and a tool interface 447. The pressure channel 421 is defined along an inner surface of the tubular body. The pressure channel 421 connects, in use, the actuator pressure channel 429 to the pressure channel 238 (FIG. 5). The tooling plate coupling interface 445 is a portion of the tubular body having an outer surface that is configured to couple, in use, with the base element coupling interface 201 (FIG. 5) provided on an inner surface of the apertures formed in the tooling plate 200. The cap 460 is integrally formed with the tubular member and encloses an end portion of the tubular body. The cap 460 obstructs an end of the pressure channel 421. The actuator pressure channel 429 is defined through the sidewall of a vacuum pin 424 in a location along the vacuum pin 424 that is selected such that two constraints are satisfied. The first of the two constraints is that the actuator pressure channel 429 be substantially covered, and therefore obstructed by, the guide portion 325 (FIG. 8A) of the floating element 323 when the floating element 323 is positioned in the extended position. The second of the two constraints is that the actuator pressure channel 429 be substantially revealed from beneath the guide portion 325 and therefore unobstructed by, the guide portion 325 of the floating element 323 when the floating element 323 is positioned in a partially retracted position and in the retracted position. The retainer 442 is a radial flange that projects from the tubular body. The retainer 442 cooperates, in use, with a front face of the guide portion 325 of the floating element 323 to define the extended position, or forward limit of travel, of the floating element 323. The tool interface 447 is defined by outer surfaces of the cap 460, the tool interface 447 is configured to cooperate with a tool (not shown), such a wrench, to engage or disengage the tooling plate coupling interface 445 with the base element coupling interface 201.

The spring 326 biases, in use, the floating element 423 into the extended position. A rear portion of the spring 326 cooperates with a front face of the tooling plate 200 (FIG. 5). The spring 326 is kept in longitudinal alignment with the vacuum pin 424 and with the floating element 323 by close cooperation of the spring 326 around a spring guide portion 428 defined on the outer surface of the vacuum pin 424.

Figure 10:
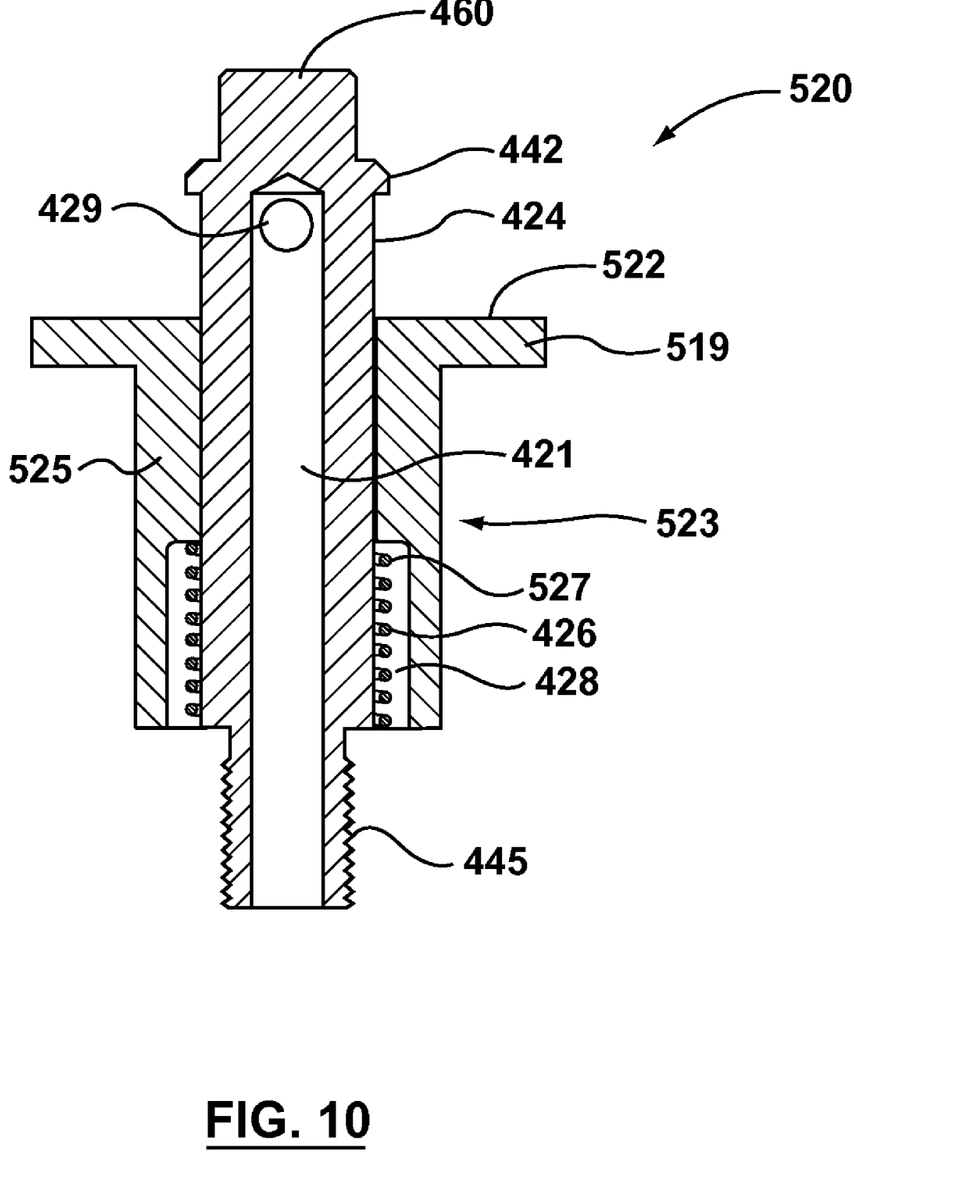
FIG. 10 is a sectional view of another non-limiting embodiment of the molded article picker.

With reference to FIG. 10 another non-limiting embodiment of a molded article picker 520 is depicted for use with the tooling plate 200 of the second post mold device 214 (FIGS. 5 & 6) in place of the molded article picker 220. The molded article picker 520 is similar in construction to the molded article picker 420 of FIG. 9 as described previously. The difference in construction is limited to the construction of the floating element 523.

The floating element 523 has a generally tubular body that surrounds, in use, the vacuum pin 424 (i.e. pressure structure). The floating element 523 includes the guide portion 525, a spring seat 527, and a radial flange 519. The guide portion 525 is provided along an upper portion of the tubular body along an inner surface that is closely fitted with, but slightly larger than, an outer surface of the vacuum pin 424 such that the floating element 523 is kept in longitudinal axial alignment with the vacuum pin 424 as the floating element 523 is moved between its extended (or forward) position and its retracted (or rear) positions. The spring seat 527 is a portion of the tubular body having an inner surface that is configured to receive, in use, a forward portion of the spring 326. The radial flange 519 is a radial piston-like member that projects from the upper portion of the tubular body (i.e. adjacent the guide portion 525). A technical effect of moving the radial flange 519 to the upper portion of the tubular body is the ability to accommodate shorter performs (not shown). In the non-limiting embodiment the floating element 523 may be fabricated, for example, from an ultrahigh molecular weight polyethylene (UHMWPE) such that a front face of the radial flange 519 is compliant to an extent that is provides a sealing face 522 that may readily form a seal with the front face 110 (not shown) of the preform 109. Those skilled in the art would appreciate that there are other suitable materials, and combinations of materials from which to fabricate the floating element 523.

Generally, the guide portion 525 of the floating element 523, the spring 326, and the actuator pressure channel 429 of the vacuum pin 424 cooperate, in use, to provide a normally-closed valve 470 that is opened responsive to a pressure applied to the floating element 523 by the preform 109.

In a further non-limiting embodiment of the present invention (not shown) the injection mold includes a stack assembly defining a mold cavity, and wherein the stack assembly is configured to be replaceable for one of conversion or refurbishment thereof.

In a further non-limiting embodiment of the present invention (not shown) the molded article picker of the second post-mold device are configured to be replaceable for one of conversion or refurbishment thereof.

The description of the exemplary embodiments provides examples of the present invention, and these examples do not limit the scope of the present invention. It is understood that the scope of the present invention only is limited by the claims. The inventive concepts described above may be adapted for specific conditions and/or functions, and may be further extended to a variety of other applications that are within the scope of the present invention. For instance, it might well be the case that for molded articles having a shape different to the one of a preform a pressure structure other than a vacuum pin might be better suited to perform the function of the present invention, i.e. to seal the molded article to the floating element and to withdraw the floating element into its retracted position. Having thus described the exemplary embodiments, it will be apparent that modifications and enhancements are possible without departing from the concepts as described. Therefore, what is to be protected by way of letters patent are limited only by the scope of the following claims.

What is claimed is:

1. A molded article picker for transferring a molded article, the molded article picker comprising:
   a floating element, the floating element configured to be movably connectable to a tooling plate for movements, in use, between an extended position and a retracted position;
   a biasing assembly;
   the floating element and the biasing assembly being configured to cooperate wherein the floating element is biased into the extended position; and a pressure structure;

a sealing face being arranged on the floating element, the sealing face being configured to seal, in use, with the molded article to define a substantially enclosed volume including the pressure structure, at least in part;

the pressure structure is configured for evacuating, in use, the substantially enclosed volume and thereby providing a vacuum force;

the floating element being configured to retract, in use, to the retracted position under the vacuum force; and a normally-closed valve for controlling a pneumatic connection between the pressure structure and the substantially enclosed volume, wherein the normally-closed valve is opened responsive to a pressure applied to the floating element by the molded article.

2. The molded article picker of claim 1, wherein the pressure structure comprises a vacuum pin extending through the floating element.

3. The molded article picker of claim 2, wherein the vacuum pin is integrally formed with the floating element.

4. The molded article picker of claim 2, wherein the floating element includes a radial flange.

5. The molded article picker of claim 4, wherein the radial flange projects from a lower portion of a tubular body that defines the floating element.

6. The molded article picker of claim 4, wherein the radial flange projects from an upper portion of a tubular body that defines the floating element.

7. The molded article picker of claim 4, wherein a front face of the radial flange is compliant to an extent that it provides the sealing face.

8. The molded article picker of claim 1, further comprising a compliable sealing element disposed on a surface of the floating element, the compliable sealing element configured to form the seal with the molded article.

9. The molded article picker of claim 1, wherein the biasing assembly includes a spring for biasing the floating element into the extended position.

10. The molded article picker of claim 9, wherein the floating element includes a cylindrical guiding pin for receiving the spring, and wherein the cylindrical guiding pin is slidably received within a cylindrical guiding recess disposed, at least in part, in a base element.

11. The molded article picker of claim 9, wherein the floating element includes a spring seat for receiving the spring.

12. The molded article picker of claim 2, wherein the floating element includes a guide portion slidably arranged on the vacuum pin.

13. The molded article picker of claim 12, wherein a pressure channel is defined in the vacuum pin, the pressure channel configured for fluid communication, in use, with a pressure source.

14. The molded article picker of claim 13, wherein a cap obstructs an end of the pressure channel.

15. The molded article picker of claim 14, wherein an actuator pressure channel is defined through a sidewall of the vacuum pin.

16. The molded article picker of claim 15, wherein the actuator pressure channel is located on the vacuum pin at a location, the location selected such that:

the actuator pressure channel is substantially covered by the guide portion of the floating element when the floating element is positioned in the extended position; and the actuator pressure channel is substantially revealed from beneath the guide portion of the floating element when the floating element is positioned in the retracted position.

17. The molded article picker of claim 2, wherein the normally-closed valve is arranged for controlling the pneumatic connection between a pressure channel of the vacuum pin and the substantially enclosed volume.

18. The molded article picker of claim 4, further comprising a base element for coupling, in use, the vacuum pin to the tooling plate.

19. The molded article picker of claim 18, further comprising a cylinder element, the cylinder element retained, in use, on the tooling plate by a flange portion of the base element.

20. The molded article picker of claim 19, wherein an actuator pressure channel is defined through a sidewall of the vacuum pin in a location adjacent the base element for evacuating, in use, an enclosed volume that is formed between an outer circumferential surface of the radial flange and an inner surface of the cylinder element.

21. The molded article picker of claim 20, wherein a pressure channel is defined in the vacuum pin, the pressure channel configured for fluid communication, in use, with a pressure source.

22. The molded article picker of claim 2, wherein a pressure channel is defined in the vacuum pin, the pressure channel configured for fluid communication, in use, with a pressure source.

23. A second post-mold device, comprising:

a tooling plate upon which are mounted a set of the molded article picker according to any one of claims 1 to 22.

24. The second post-mold device of claim 23, further comprising a set of cooling pins mounted to the tooling plate.

25. The second post-mold device of claim 24, further comprising a further set of cooling pins mounted to the tooling plate.

26. An injection molding machine, comprising:

an injection mold;

a first post-mold device that is configured to transport, in use, molded articles ejected from the injection mold; and the second post-mold device according to claim 23.

27. The injection molding machine of claim 26, wherein the second post-mold device further includes a set of cooling pins mounted to the tooling plate.

28. The injection molding machine of claim 27, wherein the second post-mold device further includes a further set of cooling pins mounted to the tooling plate.

29. The injection molding machine of claim 26, wherein the injection mold includes a stack assembly defining a mold cavity, and wherein the stack assembly is configured to be replaceable for one of conversion or refurbishment thereof.

30. The injection molding machine of claim 26, wherein the molded article picker of the second post-mold device are configured to be replaceable for one of conversion or refurbishment thereof.

31. The floating element of claim 2, wherein the tubular body includes a guide portion that is slidably arrangable, in use, on the vacuum pin of the pressure structure, and the guide portion cooperates, in use, with a actuator pressure channel of the vacuum pin to provide the normally-closed valve.

32. A floating element of a molded article picker, the floating element comprising:

a tubular body configured to be movably connectable to a tooling plate for movements, in use, between an extended position and a retracted position;

the tubular body being configured to cooperate with a biasing assembly wherein the floating element is biased into the extended position;

the tubular body configured to cooperate, in use, with a pressure structure;

a sealing face being arranged on the tubular body, the sealing face being configured to seal, in use, with a molded article to define a substantially enclosed volume including the pressure structure, at least in part; and the tubular body being configured to cooperate, in use, in a normally-closed valve for controlling a pneumatic connection between the pressure structure and the substantially enclosed volume, wherein the normally-closed valve is opened responsive to a pressure applied to the tubular body by the molded article.

33. The floating element of claim 32, wherein the pressure structure is a vacuum pin that is integrally formed with the tubular body.

34. The floating element of claim 32, wherein the tubular body includes a radial flange.

35. The floating element of claim 34, wherein the radial flange projects from a lower portion of the tubular body.

36. The floating element of claim 34, wherein the radial flange projects from an upper portion of the tubular body.

37. The floating element of claim 34, wherein a front face of the radial flange is compliant to an extent that it provides the sealing face.

38. The floating element of claim 32, further comprising a compliable sealing element disposed on a surface of the tubular body, and wherein the sealing face is provided on the compliable sealing element.

39. The floating element of claim 32, wherein the tubular body includes a cylindrical guiding pin that is configured to be slidably receivable, in use, within a cylindrical guiding recess disposed, at least in part, in a base element.

40. The floating element of claim 32, wherein the tubular body includes a spring seat for receiving a spring of the biasing assembly.

41. A method for transferring a molded article from a carrier of a first post-mold device to a molded article picker of a second post-mold device, the method comprising:

bringing a sealing face that is arranged on a floating element of the molded article picker, with the floating element being in an extended position, at least in part, into abutment with a front face of the molded article that is held within the carrier to define an enclosed volume between the molded article and the floating element; and evacuating the enclosed volume through a pressure structure of the molded article picker such that the molded article is sealed to the floating element by a vacuum force; and retracting the floating element into a retracted position with the vacuum force, thereby transferring the molded article; and opening a normally-closed valve on the molded article picker responsive to a pressure applied to the floating element by the molded article for controlling a pneumatic connection between the pressure structure of the molded article picker and the enclosed volume.

* * * * *